(12) United States Patent
Kramer

(10) Patent No.: US 10,612,766 B2
(45) Date of Patent: *Apr. 7, 2020

(54) ELECTROLUMINESCENT ELEMENT WITHIN LAMINATE

(71) Applicant: THE DILLER CORPORATION, Cincinnati, OH (US)

(72) Inventor: Robert Jacob Kramer, Franklin, OH (US)

(73) Assignee: THE DILLER CORPORATION, Cincinnati, OH (US)

(*) Notice: Subject to any disclaimer, the term of this patent is extended or adjusted under 35 U.S.C. 154(b) by 0 days.

This patent is subject to a terminal disclaimer.

(21) Appl. No.: 16/298,903

(22) Filed: Mar. 11, 2019

(65) Prior Publication Data

US 2019/0203925 A1 Jul. 4, 2019

Related U.S. Application Data

(63) Continuation of application No. 15/488,437, filed on Apr. 14, 2017, now Pat. No. 10,228,123.

(51) Int. Cl.
*H01J 1/62* (2006.01)
*F21V 33/00* (2006.01)
(Continued)

(52) U.S. Cl.
CPC .......... *F21V 33/0024* (2013.01); *B32B 3/266* (2013.01); *B32B 7/12* (2013.01);
(Continued)

(58) Field of Classification Search
None
See application file for complete search history.

(56) References Cited

U.S. PATENT DOCUMENTS

| 5,080,958 A ‡ | 1/1992 | Patterson | B32B 15/08 428/209 |
| 6,180,215 B1 ‡ | 1/2001 | Sprietsma | B32B 27/04 428/20 |

(Continued)

FOREIGN PATENT DOCUMENTS

| EP | 2613329 A1 | 7/2013 |
| WO | WO-99/38686 A1 ‡ | 8/1999 |

(Continued)

OTHER PUBLICATIONS

International Search Report and Written Opinion for corresponding International Application No. PCT/US2018/027470, dated Jul. 6, 2018.‡

*Primary Examiner* — Vip Patel
(74) *Attorney, Agent, or Firm* — Marshall, Gerstein & Borun LLP

(57) ABSTRACT

A laminate having an electroluminescent element disposed within the laminate is disclosed. The laminate includes a first paper layer having at least first and second vias through the first paper layer; a first electrically-conductive layer comprising an electrically-conductive material, the first electrically-conductive layer being disposed over the first paper layer; a dielectric layer disposed over the first electrically-conductive layer; a light emissive layer comprising an electroluminescent material, the light emissive layer being disposed over the dielectric layer; a second electrically-conductive layer comprising a translucent electrically-conductive material, the second electrically-conductive layer being disposed over the light emissive layer; an insulating layer disposed over the second electrically-conductive layer. The first paper layer and the insulating layer encapsulate the (Continued)

first electrically-conductive layer, the dielectric layer, the light emissive layer, and the second electrically-conductive layer.

20 Claims, 5 Drawing Sheets

(51) Int. Cl.
    *H05B 33/22*         (2006.01)
    *H05B 33/14*         (2006.01)
    *G09F 13/22*         (2006.01)
    *B32B 7/12*           (2006.01)
    *B32B 29/00*         (2006.01)
    *B32B 3/26*          (2006.01)
    *B23B 29/00*         (2006.01)

(52) U.S. Cl.
    CPC ............ *B32B 29/005* (2013.01); *G09F 13/22* (2013.01); *H05B 33/145* (2013.01); *H05B 33/22* (2013.01); *A47B 2220/0077* (2013.01); *B23B 29/00* (2013.01); *B32B 2250/26* (2013.01); *B32B 2255/12* (2013.01); *B32B 2255/205* (2013.01); *B32B 2260/028* (2013.01); *B32B 2260/046* (2013.01); *B32B 2307/202* (2013.01); *B32B 2307/204* (2013.01); *B32B 2307/206* (2013.01); *B32B 2307/402* (2013.01); *B32B 2307/422* (2013.01); *B32B 2451/00* (2013.01); *B32B 2457/00* (2013.01)

(56) References Cited

U.S. PATENT DOCUMENTS

| | | | |
|---|---|---|---|
| 6,468,677 B1 ‡ | 10/2002 | Benton | B32B 27/04 156/67 |
| 10,118,547 B2 ‡ | 11/2018 | Duce et al. | |
| 2002/0023777 A1 ‡ | 2/2002 | Ochi | H05K 3/4069 174/25 |
| 2004/0224135 A1 ‡ | 11/2004 | Krebs | G06K 7/0008 428/19 |
| 2006/0127673 A1 ‡ | 6/2006 | Aho | B32B 7/12 428/41 |
| 2007/0006452 A1 ‡ | 1/2007 | Egitto | H05K 3/4069 29/832 |
| 2007/0102804 A1 ‡ | 5/2007 | Nakamura | H05K 3/4655 257/69 |
| 2011/0101366 A1 ‡ | 5/2011 | Dozen | B32B 29/00 257/66 |
| 2014/0210279 A1 ‡ | 7/2014 | Van Herpen | H04B 5/0012 307/10 |
| 2015/0048687 A1 ‡ | 2/2015 | Wang | H01F 38/14 307/10 |
| 2015/0296612 A1 ‡ | 10/2015 | Gumbiowski | A47B 96/206 174/26 |
| 2016/0104566 A1 ‡ | 4/2016 | O'Brien | H01F 27/24 307/10 |

FOREIGN PATENT DOCUMENTS

| | | | |
|---|---|---|---|
| WO | WO-2015/060781 A1 | | 4/2015 |
| WO | WO-2017/111590 A1 ‡ | | 6/2017 |
| WO | WO-2017/138812 A1 ‡ | | 8/2017 |
| WO | WO-2017/142412 A1 ‡ | | 8/2017 |

‡ imported from a related application

ELECTROLUMINESCENT ELEMENT WITHIN LAMINATE

CROSS REFERENCE TO RELATED APPLICATION

This application is a continuation of U.S. patent application Ser. No. 15/488,437, filed Apr. 14, 2017, which is incorporated herein by reference in its entirety and made a part hereof.

BACKGROUND OF THE INVENTION

Decorative laminates have been used as surfacing materials for many years, in both commercial and residential applications, where pleasing aesthetic effects in conjunction with desired functional behavior (such as superior wear, heat and stain resistance, cleanability and cost) are preferred. Typical applications have historically included furniture, kitchen countertops, table tops, store fixtures, bathroom vanity tops, cabinets, wall paneling, office partitions, and the like.

Laminates are useful as surfacing materials, including as decorative surfaces, in many situations due to their combination of desirable qualities (e.g., superior wear, heat and stain resistance, cleanability, and cost). Laminate surfaces are composed of discrete layers, such as layers of resin-impregnated kraft paper that are pressed to form the laminate. One conventional decorative laminate is made by stacking three sheets of treated kraft paper (e.g., three sheets of phenol-formaldehyde resin-impregnated kraft paper), dry decorative paper (e.g., a print sheet), and a sheet of treated overlay paper (e.g. melamine-formaldehyde resin-impregnated tissue paper or acrylic resin-impregnated tissue paper), one on top of another and then bonded together with heat and pressure.

A high-pressure laminate process (HPL) is an irreversible thermal process wherein resin-impregnated sheets of kraft paper undergo a simultaneous pressing and heating process at relatively high levels of heat and pressure, such as temperatures greater than or equal to 125° C. and at least 5 mega Pascals (MPa) of pressure, typically for a press cycle of 30-50 minutes. An HPL process contrasts with low pressure laminate processes (LPL) that is conducted at pressures of less than 5.0 MPa, typically between 2-3 MPa.

SUMMARY OF THE DISCLOSURE

This summary is provided to introduce a selection of concepts in a simplified form that are further described in the Detailed Descriptions. This summary is not intended to identify key features or essential features of the claimed subject matter, nor is it intended to be used to limit the scope of the claimed subject matter.

A laminate with an electrical element (e.g., an electroluminescent element) embedded within the laminate comprising a first paper layer having at least first and second vias through the first paper layer, a first electrically-conductive layer comprising an electrically-conductive material, the first electrically-conductive layer being disposed over the first paper layer, a dielectric layer disposed over the first electrically-conductive layer, a light emissive layer comprising an electroluminescent material, the light emissive layer being disposed over the dielectric layer, a second electrically-conductive layer comprising a translucent electrically-conductive material, the second electrically-conductive layer being disposed over the light emissive layer, an insulating layer disposed over the second electrically-conductive layer, wherein the first paper layer and the insulating layer encapsulate the first electrically-conductive layer, the dielectric layer, the light emissive layer, and the second electrically-conductive layer within the laminate, and wherein the first electrically-conductive layer is electrically coupled to the first via and the second electrically-conductive layer is electrically coupled to the second via, the first and second vias including the electrically-conductive material therein is disclosed.

A method for manufacturing a laminate with an electrical element (e.g., an electroluminescent element) embedded within the laminate comprising forming at least first and second vias through a first paper layer, disposing a first electrically-conductive layer over the first paper layer, wherein the first electrically-conductive layer comprises an electrically-conductive material, disposing a dielectric layer over the first electrically-conductive layer, disposing a light emissive layer over the dielectric layer, wherein the light emissive layer comprises an electroluminescent material, disposing a second electrically-conductive layer over the light emissive layer, wherein the second electrically-conductive layer comprises a translucent electrically-conductive material, disposing an insulating layer over the second electrically-conductive layer, and compressing the first paper layer, the first electrically-conductive layer, the dielectric layer, the light emissive layer, the second electrically-conductive layer, and the filled first and second vias according to a lamination process, thereby electrically connecting a first via to the first electrically-conductive layer and a second via to the second electrically-conductive layer and encapsulating the first paper layer, the first electrically-conductive layer, the dielectric layer, the light emissive layer, and the second electrically-conductive layer within the laminate is disclosed.

DETAILED DESCRIPTION

Figure 1:
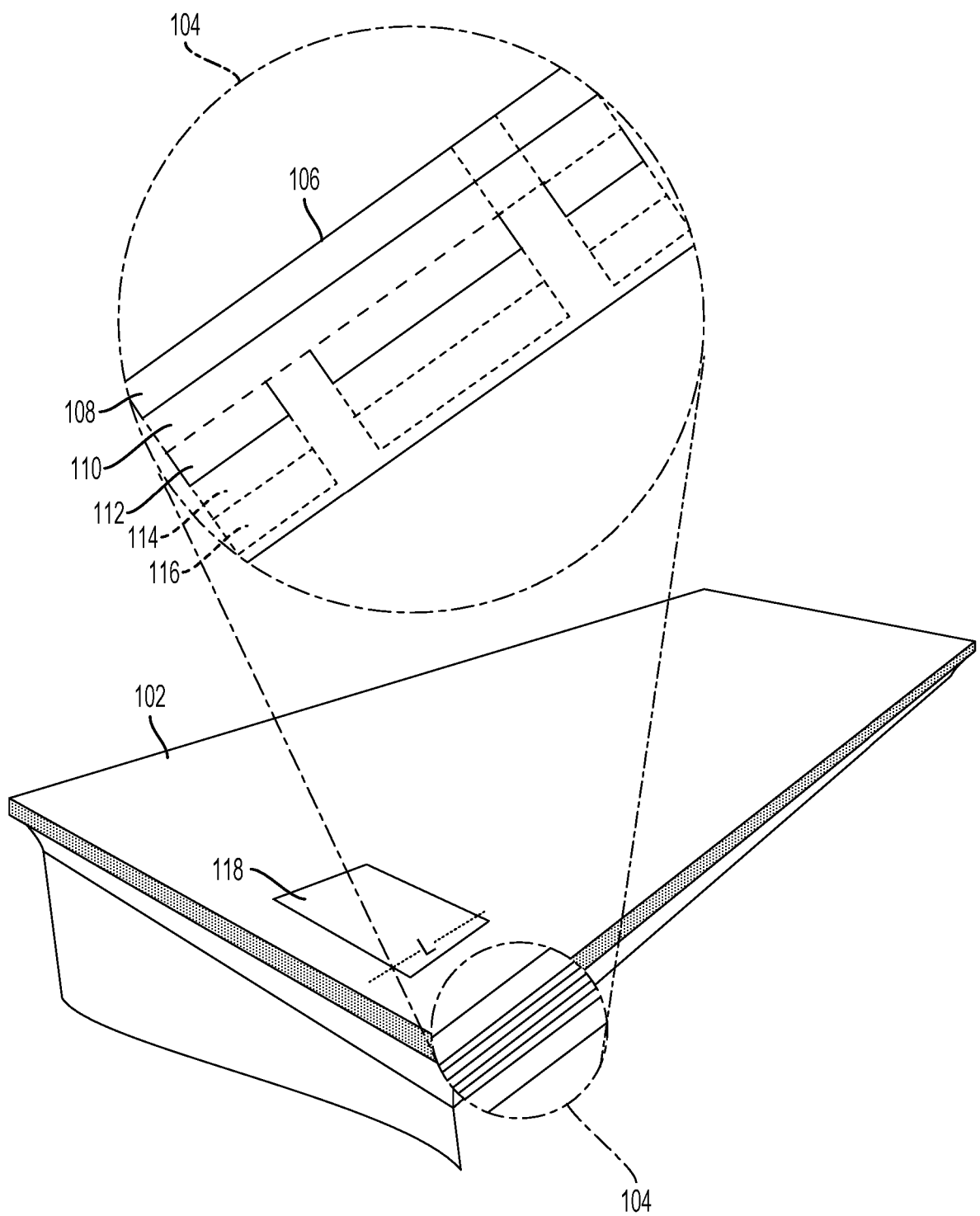
FIG. 1 is a schematic diagram of an example of a laminate surfacing material integrated into a countertop with an electroluminescent element disposed on multiple layers within the laminate structure.

A laminate with an electrical element (e.g., an electroluminescent element) embedded within the laminate comprising a first paper layer having at least first and second vias through the first paper layer, a first electrically-conductive layer comprising an electrically-conductive material, the first electrically-conductive layer being disposed over the first paper layer, a dielectric layer disposed over the first electrically-conductive layer, a light emissive layer comprising an electroluminescent material, the light emissive layer being disposed over the dielectric layer, a second electrically-conductive layer comprising a translucent electrically-conductive material, the second electrically-conductive layer being disposed over the light emissive layer, and an insulating layer disposed over the second electrically-conductive layer is disclosed. In embodiments, the first paper layer and the insulating layer may encapsulate the first electrically-conductive layer, the dielectric layer, the light emissive layer, and the second electrically-conductive layer within the laminate. The first electrically-conductive layer may be electrically coupled to the first via and the second electrically-conductive layer may be electrically coupled to the second via, the first and second vias including the electrically-conductive material therein, the first via making electrical contact with the first electrically-conductive layer and the second via making electrical contact with the second electrically-conductive layer. In embodiments, the insulating layer may comprise a decorative layer. For example, the insulating layer may comprise a resin-impregnated decorative layer. As another example, the insulating layer may comprise a treated overlay paper layer. When the insulating layer comprises a treated overlay paper layer, the laminate may further comprise a dry or untreated decorative paper (also known as a print sheet) between the treated overlay paper layer and the second paper layer. Of course, the laminate may also comprise glue film layers, for example when untreated kraft paper layers are included as further described below.

Generally, as used herein, a "decorative layer" is a visible outer layer in the (final, assembled) laminate. A decorative layer may have decorative colors and/or designs. Of course, as mentioned above, an overlay layer may be disposed above a decorative layer provided that the decorative layer is at least partially visible through the overlay layer.

A laminate surfacing material with the electrical element arranged on different paper layers (e.g., resin-impregnated paper layers) of the laminate surfacing material has particularly useful characteristics, including: the ability to add more electrical elements in a space-efficient manner by providing additional electrically-conductive materials on different layers of the laminate; favorable heat-dissipation properties due to the lack of insulating air inside the laminate and optional use of fillers with high heat transfer coefficients (e.g., ceramics such as aluminum nitride, aluminum oxide, boron nitride, and combinations thereof) in the resin formulations used to prepare the resin-impregnated paper layers such that heat transfer away from the electrical element is enhanced, effectively turning the laminate surfacing material into an efficient heat sink and facilitating the utilization of the electrical element; unexpected and surprising electrical conductivity of the electrically-conductive material used to provide the electrical element even after undergoing an HPL process; and the ability to be integrated into almost any surface (e.g., countertop, wall, piece of furniture, door, window frame, interior of a vehicle, etc.). The resin-impregnated paper layers also provide a durable enclosure for the electrical element.

The electrical element may be formed by providing (e.g., disposing) an electrically-conductive material (e.g., electrically-conductive ink) onto paper layers (e.g., kraft paper, tissue paper, etc.) having via holes cut through the paper layers for electrically coupling sub-elements or layers of the electrical element. Disposing (e.g., printing) the electrically-conductive material onto paper allows the paper fibers to act as reinforcements for various layers of the electrical element created from the electrically-conductive material, preventing breakage of the electrical element due to shrinkage or expansion due to various environmental conditions. The layers of the electrical element may be stacked and encapsulated between discrete paper layers using a lamination process. While low pressure lamination may be used to prepare laminates according to the disclosure, a high pressure lamination process including a re-cooling stage (referred to herein as "high pressure lamination process") is preferred.

As described herein, the electrical element is "encapsulated" or substantially protected by providing the electrically-conductive material for the electrical element on a first paper layer and disposing an insulating layer above the electrically-conductive material such that the electrical element is at least partially protected or shielded from ambient atmosphere by the overlying layer.

It has been found that when laminates are exposed to the heat and pressure in the high pressure lamination process, the risk of breaking or delamination of the sub-elements or layers of the electrical element is greatly reduced. The high pressure lamination process allows the electrical element to have electrically-conductive tracks having improved track densification, which achieves surprisingly higher conductivities than through other conventional manufacturing techniques. Initiating the high pressure lamination process after stacking the layers of the electrical element between the paper layers collectively cures layers included in the laminate simultaneously, which eliminates the conventional need for using an adhesive to adhere together layers that have individually been fully cured. The high pressure lamination process allows for accurate control of temperature and pressure (e.g., heating and cooling cycles) in order to control the rate of dimensional change of layers and surprisingly leads to enhanced electrical conductivity of the electrically-conductive material used in the laminate process.

Various embodiments of the present disclosure are methods for preparing laminates with the electrical element embedded within the laminate. The methods include forming via holes through paper layers, disposing (e.g., inkjet printing, flexographic printing, gravure printing, screen printing, extrusion printing, and the like) sub-elements or layers of the electrical element with electrically-conductive material onto the paper layers, and providing vias through the paper layers at selected via hole locations with an electrically-conductive material to electrically couple various layers of the electrical element. Factors in determining the selected locations may include efficient layout design, avoiding shorting layers of the electrical element, etc. The layers of the electrical element may be stacked and encapsulated between the paper layers by subjecting the laminate to the high pressure lamination process, which surprisingly results in advantageously enhanced densification of the electrically-conductive material and excellent conductivity. It should be noted that the same electrically-conductive material may be used for the electrical element and the vias, but different electrically-conductive materials may also be used.

In one preferred embodiment, a method of making a laminated surface material comprises providing at least an first untreated kraft paper layer, a glue film layer, and an insulating layer; forming an electrical element comprising an electrically-conductive material, the electrical element further comprising a first electrically-conductive layer, a dielectric layer disposed over the first electrically-conductive layer, a light emissive layer disposed over the dielectric layer, and a second electrically-conductive layer disposed over the light emissive layer arranged on the first untreated kraft paper layer; arranging a stack comprising at least the first untreated kraft paper layer, the glue film layer, and the insulating layer such that the insulating layer is disposed above the glue film layer; compressing the stack according to a lamination process. Typically, the stack includes an additional glue film layer disposed below the first untreated kraft paper layer so as to allow a sufficient amount of resin to saturate the laminate during a lamination process, in order to provide sufficient mechanical strength to the final formed laminate. By providing the first electrically-conductive layer on untreated kraft paper, significantly improved alignment of holes formed in the stack can be achieved than when the first electrically-conductive layer is disposed on resin-impregnated paper layers. A glue film layer as used herein is a layer having a sufficient amount of thermoset resin to saturate an adjacent untreated paper layer (e.g., a decorative layer or a kraft paper layer). Typically, a glue film layer will comprise a paper layer having between 30-80 percent by weight of a thermoset resin. Preferably, the thermoset resin of the glue film comprises phenol-formaldehyde resin.

Thus, a preferred laminated surface material comprises a stack comprising at least an first untreated kraft paper layer, a glue film layer, and an insulating layer such that the insulating layer is disposed above the glue film layer; an electrical element comprising an electrically-conductive material, the electrical element further comprising a first electrically-conductive layer, a dielectric layer disposed over the first electrically-conductive layer, a light emissive layer disposed over the dielectric layer, and a second electrically-conductive layer disposed over the light emissive layer arranged on the first untreated kraft paper layer. Typically, the stack includes an additional glue film layer disposed below the first untreated kraft paper layer so as to allow a sufficient amount of resin to saturate the laminate during a lamination process, in order to provide sufficient mechanical strength to the final formed laminate.

Electrically-conductive materials suitable for use in accordance with the various embodiments of the present disclosure include any material which can be disposed upon paper, such as resin-impregnated paper, and which may be electrically electrically-conductive. In some embodiments, the composition of the electrically-conductive material includes: (i) a particulate, electrically-conductive material; (ii) a binder; and optionally (iii) a microcrystalline cellulose component.

The particulate, electrically-conductive material may include any one of metals, alloys, electrically-conductive carbons (e.g., electrically-conductive allotropes of carbon, graphites), electrically-conductive polymers (e.g., polypyrrole), electrically-conductive metallized polymers (e.g., metallized polyethylene terephthalates), and combinations thereof. In a preferred aspect, the particulate electrically-conductive material comprises silver and/or silver alloys. Electrically-conductive ink compositions which may be disposed to provide electrically-conductive material on a paper layer and are thus suitable for use in various embodiments of the present disclosure typically include particles comprising metal, metal alloys, electrically-conductive carbon, or other electrically-conductive materials such as polymers, in a carrier medium which may include other polymers, solvents and additives. Various known methodologies such as inkjet printing, screen printing, flexographic printing, gravure printing, or extrusion printing may be used to dispose the electrically-conductive ink compositions on the substrate.

One embodiment of an electrically-conductive ink composition suitable for providing the particulate electrically-conductive material is an electrically-conductive ink composition comprising: (i) a particulate, electrically-conductive material; (ii) a carrier liquid; (iii) a polymer binder; and (iv) a microcrystalline cellulose component. Another embodiment of an electrically-conductive ink composition suitable for providing the particulate electrically-conductive material is an electrically-conductive ink composition comprising: (i) a particulate, electrically-conductive material; (ii) a carrier liquid; (iii) a polymer binder; and (iv) a microcrystalline cellulose component; wherein the particulate, electrically-conductive material comprises a component selected from the group consisting of silver and silver alloys; and wherein the microcrystalline cellulose component is present in an amount of from about 0.05% to about 10% by weight based on the composition and has an average particle size of from about 20 to about 100 μm. In certain embodiments of the disclosure, the microcrystalline cellulose component may include two or more microcrystalline celluloses having different average particle sizes. As noted above, disposing methods such as inkjet printing, flexographic printing, gravure printing, screen printing, and extrusion printing may dispose the electrically-conductive material onto the paper layers, such as kraft paper and overlay paper, but depending on the type of paper, the electrically-conductive material may or may not penetrate completely through the paper.

If kraft paper (i.e., unbleached paper that is between 50-400 GSM (or $g/m^2$)) is used, and an electrically-conductive ink composition is disposed thereon, the electrically-conductive material may penetrate halfway through the kraft paper, whereas if overlay paper (i.e., bleached paper that is between 10-50 GSM) having less than half the basis weight of kraft paper is used, and an electrically-conductive ink composition is disposed thereon, the electrically-conductive material will typically penetrate completely through the overlay paper. As such, in order to couple electrically-conductive material provided on different layers of kraft paper together, apertures can be cut at least halfway through the kraft paper, so that electrically-conductive material disposed over a top surface of the kraft paper penetrates halfway through the first kraft paper to form a via and establish an electrical connection with a same type or different type electrically-conductive material provided on a top surface of a second kraft paper layer underlying the first kraft paper layer. Because disposed electrically-conductive material may penetrate completely through overlay paper, it is not necessary to cut apertures in the overlay paper to form a via and couple the electrically-conductive material disposed on a top surface of a first overlay paper layer to a same type or different type electrically-conductive material disposed on a top surface of a second paper layer disposed thereunder. Once disposed, the electrically-conductive material may be subject to the high pressure lamination process involving pressing at elevated temperature and pressure.

Electrically-conductive material, such as silver particles, may not be the only material used to form the electrical element. For example, barium titanate ($BaTiO_3$) particles are used to form a dielectric of the electrical element. To form a translucent conductor, antimony-doped tin oxide (ATO) or indium tin oxide (ITO) particles may be used. To form an electroluminescent element, zinc sulfide (ZnS) doped with manganese, copper, a fluorescent material, or a phosphorescent material may be used.

The electrically-conductive materials described above may be disposed in a pattern over the paper layers in various embodiments of the present disclosure. Suitable patterns include, but are not limited to: continuous, meandering lines, spirals, circles, ovals, polyhedral shapes such as rectangles, squares, hexagons, octagons, spirangles, sawtooth waves, and combinations thereof. Preferably, electrically-conductive materials may be disposed in patterns which provide a relatively large amount of electrically-conductive material on the paper layer while maintaining a gap between adjacent portions of the electrically-conductive pathway. The cross-sectional area of any linear portion of an electrically-conductive material may be important in circumstances where electrical resistance is to be minimized as the total electrical resistance of any electrically-conductive track is the product of the specific resistance per square (related to cross-sectional area) and the track length. In other words, as understood by those skilled in the art, greater cross-sectional areas lead to lower overall track resistances which lead to lower resistive heating for similar electric current levels.

It may be preferable to optimize the relationship between track vertical thickness, the cross sectional area and the pitch (i.e., the distance between two adjacent linear portions or tracks of the electrically-conductive material disposed on a paper layer) which should be controlled to be as small as possible while ensuring that the two adjacent linear portions do not touch. It is also important to note that the pressure involved in the compression steps of the high pressure lamination reduces the vertical thickness of the electrically-conductive track. The overall effect on total electrical resistance may vary as the compression may increase specific resistance of the electrically-conductive material by decreasing the cross-sectional area, while also increasing electrically-conductive contact between electrically-conductive particles within the electrically-conductive materials, thus decreasing resistance. Thus, various factors affect overall resistance. Preferably one or more such factors are considered in efforts to reduce overall resistance, and thus, heat generation.

The laminate in accordance with the various embodiments of the present disclosure may include one or more electrical contact pads which allow an electrical connection to be established to a via from the exterior of the laminate. In various embodiments wherein the laminate includes the electrical element comprising same or different electrically-conductive materials connected together, as described herein, the laminate may include an electrical contact pad coupled to a via providing a site for making an electrical connection to a first terminus of the first electrically-conductive material, and a second electrical contact pad coupled to a second via providing a site for making an electrical connection to the second terminus of the second electrically-conductive material. In the various embodiments of the present disclosure, the laminate may further be coupled to a component or components connected to the electrical contact pads on the exterior of the laminate which component(s) are configured to accept AC, or pulsed DC, voltage input from an electrical source such that the electrically-conductive material(s) are provided with a current. Such components may include, but are not limited to various receptacles for AC and DC plugs, and terminal boxes or the like for hard-wiring AC or DC inputs. Electrical contact with the vias may also be established by coupling any electrically-conductive material to the electrical contact pads using various structures including but not limited to metal tabs, screws, prongs, cylindrical receptacles, spring-loaded pins, etc. Additionally, methods of establishing permanent electrical contact can be established by affixing an external component or conductor to the electrical contact pads by soldering or the use of electrically-conductive adhesives.

A laminate's paper layers may be impregnated with resin such that the paper layers, when stacked and compressed in the high pressure lamination, can be cured or cross-linked. The resin can be a thermoset resin such that the paper layers in a stacked relationship can be compressed and heated to cure the thermoset resin. Specific suitable resins for use in the various embodiments of the present disclosure may differ depending on whether the resin-impregnated paper layer is an outer protective layer (e.g., an insulating layer), or an interior core layer (e.g., a treated kraft paper layer), or a base layer of the laminate surfacing material (e.g., a treated kraft paper layer). Generally, resin-impregnated paper layers are impregnated with any suitable thermoset resin including, but not limited to, acrylics, polyesters, polyurethanes, phenolics, phenol-formaldehydes, urea-formaldehydes, aminoplastics, melamines, melamine formaldehydes, diallylphthalates, epoxides, polyimides, cyanates, and polycyanurates, or copolymers, terpolymers or combinations thereof. Phenol-formaldehydes are generally preferred for impregnating kraft paper and acrylics or melamine-formaldehydes are generally preferred for impregnating overlay paper. As used in this disclosure, an insulating layer may be a translucent layer. A translucent layer means any layer that permits at least some light to pass there through. In other words, layers that are partially opaque are included as translucent layers.

In some implementations, resin-impregnated paper layers which are core layers are impregnated with a phenolic and/or epoxy resin, such as, for example, a phenolic-formaldehyde resin. Impregnating paper layers with a resin can be carried out in any suitable manner sufficient to apply a controlled quantity of resin to the paper, including but not limited to, screen printing, rotary screen printing, dip and squeeze, dip and scrape, reverse roll-coating, Meyer bar, curtain coating, slot-dye and gravure roller. The weight percentage of resin applied, relative to the weight of the paper layer as measured on an oven dried basis, may be in the range of about 5 to 75%, with a preferred resin content percent (determined relative to final weight) of about 15-45%. As the resins used in the impregnating step are normally aqueous or solvent based solutions, it is common in the laminating process to include a paper drying stage to reduce the paper solvent loading. In the various embodiments of the present disclosure, the weight percent level of residual solvent in the impregnated paper may be 2.5-15% with a typical level of about 5%. As used herein, cured can refer to both curing of a thermoset resin in the sense of its irreversible setting, or the crosslinking of other polymers with a separate cross-linker or by various forms of energy, or any means of fixing the resin when the laminate surfacing material is in its compressed form such that the electrically-conductive materials are encapsulated and will remain so during normal operation.

Suitable papers which may be used in resin-impregnated paper layers in accordance with the various embodiments of the present disclosure include but are not limited to: cellulose fiber, synthetic woven or non-woven fiber, or/and microfiber or/and nanofiber, mixtures of cellulose or/and synthetic fiber based papers or/and mineral fiber based papers or/and glass fiber based papers, coated or non-coated, pre-impregnated or non pre-impregnated that could be generally used for the production of laminates. In various embodiments of the present disclosure, paper suitable for use in resin-impregnated paper layers has at least one of the following properties: a minimum wet strength in the machine direction of 1400 cN/30 mm in accordance with the test method of the International Standard DIN ISO 3781, a Klemm absorbency range (capillary rise) in the machine direction of 30 to 90 mm/10 min in accordance with the test method of the International Standard DIN ISO 8787 with a preferred absorbency of 45 mm/10 min, Ash content 0 to 50% depending of the intrinsic nature of the paper used in accordance with the test method of the International Standard Din ISO 2144, a basis weight range of 10 to 400 GSM at moisture content range of 2 to 8% in accordance with the test method of the International Standard DIN ISO 536, a pH (on hot extract) between about 4 to 9 in accordance with the test method of the International Standard DIN ISO 6588. In various embodiments of the present invention, papers comprising at least a portion of recycled materials may be used.

In various preferred embodiments of methods of manufacturing surfacing materials in accordance with the present disclosure, the high pressure lamination process may be employed. In accordance with such various preferred embodiments, the multiple layers, including both paper layers and layers of the electrical element according to any of the previously described embodiments are positioned in a stacked relationship between two pressing plates. In such a high pressure lamination process, the plates are then pressed to a specific pressure of at least 5 MPa. The temperature is then raised in excess of 125° C., typically to about 140° C. The plates are then held at the elevated pressure and temperature for a period of time suitable for curing the resin. The temperature may then be lowered to 40° C., while maintaining the elevated pressure. The typical cycle time under pressure is between about 25 and about 50 minutes. Upon achieving a temperature of 40° C., the pressure on the plates may then be reduced to zero gauge pressure. While it is important to take care in ensuring that the stacked layers are aligned where an electrically-conductive connection between adjacent electrically-conductive materials through an aperture in an intervening layer is to be established, the layers need not otherwise be placed in perfect edge to edge alignment, as a post-pressing trimming may be carried out to shape the final surfacing material.

While resin-impregnated layers are typically used to prepare the laminates comprising an electrical element disposed on discrete layers of the laminate according to the disclosure, alternatively, paper layers having pressure-sensitive adhesives thereon can be compressed with the pressure-sensitive adhesives in a facing relationship to form a comparable laminate structure. In such a process, a mask can be applied at any locations where vias are desired in the final laminate product to facilitate via formation, similar to the procedure described herein with reference to FIG. 3.

Other examples of electronic components that may be included in the core of the laminate include components needed to provide current to the electrical element. In an implementation, a power transistor serves as an amplifier for driving the electrical element in the installed laminate. A full wave rectifier is configured to convert incoming AC power from a power source to a DC value for use in driving the electrical element in the installed laminate. A voltage regulator is configured to create a usable voltage for charging depleted batteries in an electronic component. A control circuit is configured to manage the charging process for lithium-ion (Li-Ion) or NiMH battery chemistries, etc. in electronic components. Each of these components can be coupled to the electrical element in the laminate surfacing material and disposed between discrete layers of the laminate surfacing material.

FIG. 1 is a schematic diagram of an example of electrically functional system 100 including a laminate surfacing material 106 with an embedded electrical element on multiple layers integrated into a countertop 102. Other types of surfaces may also be covered with the laminate surfacing material 106 (e.g., wall, door, window, piece of furniture, interior of a vehicle, etc.). The laminate surfacing material 106 may include electrically-conductive material and other material described above (e.g., $BaTiO_3$ particles, ATO particles, ITO particles, ZnS doped with manganese, a fluorescent material, a phosphorescent material) disposed as electrically electrically-conductive tracks or layers of the electrical element on two or more layers of the laminate surfacing material. In an implementation, the electrically-conductive material and other material described above may not be disposed throughout the entire area covered by the laminate surfacing material (e.g., the entire countertop 102), but rather are located in only a portion of the laminate surfacing material, such as in a marked designated area 118.

Bubble 104 illustrates a cross-section view of an example laminate including the electrical element disposed on different layers of the laminate. In an implementation, electrically-conductive material (e.g., electrically-conductive ink) is disposed in the shape of electrically-conductive plates on paper layers of the substrate. Throughout this disclosure, references to electrically-conductive material or ink should be understood to include the electrically-conductive material or ink itself in addition to electrically-conductive particles left behind after the electrically-conductive material or ink has dried.

Several layers forming the electrical element are generally illustrated in bubble 104. In the cross-section view of bubble 104, paper layer 112, optional additional paper layers 114, 116, optional decorative paper layer 110, and insulating layer 108 are visible along the cross-section. Paper layers 112-116 illustrate two via holes through each layer. Optional decorative paper layer 110 illustrates one via hole through the layer, and insulating layer 108 illustrates an optional via hole through the layer. In an implementation, electrically-conductive material and other material described above (e.g., $BaTiO_3$ particles, ATO particles, ITO particles, ZnS doped with manganese, a a fluorescent material, phosphorescent material) are disposed on one or more layers 108-116 constituting the laminate surfacing material 106. In such a cross-section view, an electroluminescent element or other electrical component(s) embedded in layers 108-116 of the laminate surfacing material may extend linearly along the line L or may be in a direction perpendicular to the line L, in which case the layers of the electroluminescent element or other electrical component(s) would appear shorter in the cross-section view because only the width of the electrically-conductive track, and not the length, would be visible.

In use, the surface 102 may be equipped with an electronic component (e.g., an oscillator capable of producing a chosen resonant frequency, a power transistor to serve as an amplifier for driving the electrically-conductive material(s), a full wave rectifier to convert incoming AC power to a DC value, a voltage regulator to create a usable voltage for charging depleted batteries, a control circuit to manage the charging process for lithium-ion (Li-Ion) or NiMH battery chemistries, or a power supply to provide AC, or pulsed DC, voltage) such that the electrically-conductive material(s) are provided with a current. The electronic component may be electrically connected to the electrically-conductive material(s) disposed in layers 108-116 to provide the voltage. In at least one implementation, the electronic device may be physically enclosed in a structure beneath surface 102 and user interface controls are displayed to the user via surface 102 (e.g., LED lights embedded in surface 102, a control panel installed in surface 102).

Figure 2:
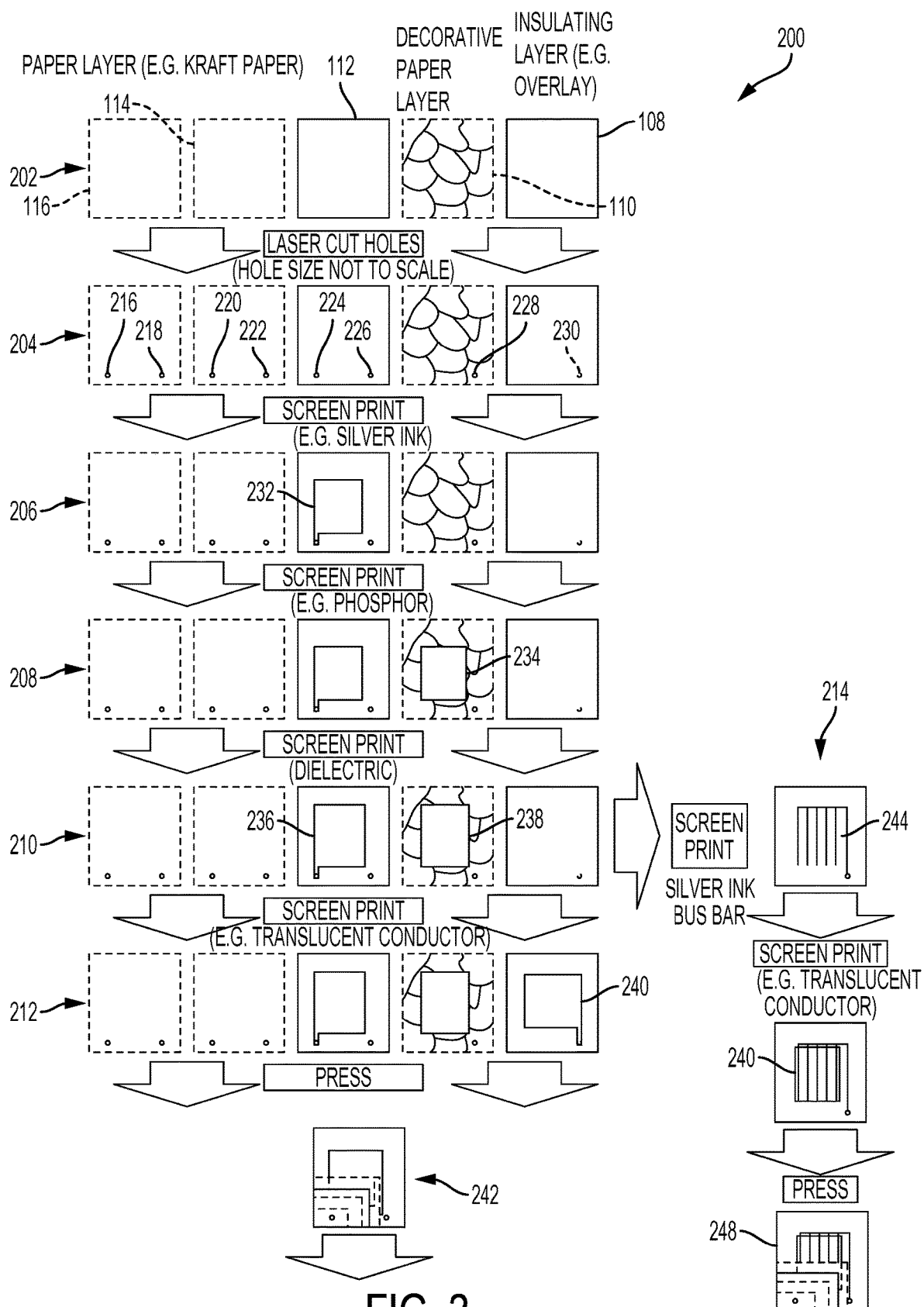
FIG. 2 shows an example of a laminate having an electroluminescent element disposed within the laminate structure.

FIG. 2 shows an example of laminate surfacing material 106 having an electroluminescent element disposed within the laminate, as shown in laminate 200. Specifically, as shown in row 202, laminate 200 includes a paper layer 112 (e.g., kraft paper) and an insulating layer 108, as described in FIG. 1, between which layers of an electroluminescent element (i.e., electrically-conductive layers, a dielectric layer, and a light emissive layer) are disposed. The paper layer 112 may be impregnated with resin, such as phenolic resin. The insulating layer 108 may be untreated overlay (e.g., tissue paper or any suitable paper not treated with melamine resin), treated overlay (e.g., paper treated with melamine resin), clear plastic film, glass, film provided on a decorative paper layer, or two or more of the aforementioned stacked together. Layers of the electroluminescent element may be disposed by various methodologies, such as inkjet printing, screen printing, flexographic or gravure printing, extrusion printing, and three-dimensional printing. The laminate 200 may also include additional paper layers 114, 116 (e.g., kraft paper) and a decorative paper layer 110 (e.g., print sheet) as needed. The additional paper layers 114, 116 may be impregnated with resin, such as phenolic resin, and the decorative paper layer 110 may be untreated, and thus dry.

As shown in row 204, any one or more of the paper layers may include a hole or via that may be formed or cut through the entire paper layer. For example, paper layer 112 includes via holes 224, 226. Insulating layer 108 may include third via hole 230 depending on application. If the laminate 200 requires a decorative paper layer, decorative paper layer 110 includes via hole 228. If the laminate 200 requires additional paper layers, additional paper layers 114, 116 include via holes 220, 222 and via holes 216, 218, respectively. The via holes described may be formed, cut through, or punched through, such as by a mechanical device or a laser, such that upon stacking paper layers on top of each other, when filled with electrically conductive material, the via holes are vertically aligned. For example, via holes 216, 220, and 224 are vertically aligned and via holes 218, 222, 226, 228, 230 are vertically aligned other when paper layers in row 204 are stacked on top of each other. As such, via holes of one paper layer may overlie via holes of another paper layer such that the holes are vertically aligned, so as to facilitate via formation.

As shown in row 206, an electrically-conductive material may be disposed over paper layer 112 to form a first electrically-conductive layer 232 of the electroluminescent element. In various embodiments of the laminate 200, one or more electrically-conductive materials may be disposed on either side or both of one or more paper layers. The electrically-conductive materials may be disposed in any shape, size, and may even form an outline of an aesthetic design. Electrically-conductive materials suitable for use in accordance with the various embodiments of the laminate 200 include any material which can be disposed upon paper, particularly resin-impregnated paper, and which may be electrically electrically-conductive. Suitable electrically-conductive materials include metals, alloys, and electrically-conductive inks. Electrically-conductive inks are commercially available from a number of sources and can be prepared using a number of known methods. Particularly preferred electrically-conductive inks suitable for use in various preferred embodiments of the present disclosure include silver and/or electrically-conductive carbon particles. The additional paper layers 114, 116 may be disposed on the side of the paper layer 112 opposite the first electrically-conductive layer 232 of the electroluminescent element.

As shown in row 208, an electroluminescent material may be disposed over the decorative paper layer 110 (if needed) to form a light emissive layer 234 of the electroluminescent element. The electroluminescent material may be zinc sulfide (ZnS) doped with manganese, copper, a fluorescent material, a phosphorescent material, or any suitable material to form a light emissive layer of the electroluminescent element. Alternatively, although not pictured, the electroluminescent material may be disposed directly over the first electrically-conductive layer 232 to form the light emissive layer 234 of the electroluminescent element. If needed, the decorative paper layer 110 may be disposed over light emissive layer 234, but because light from light emissive layer 234 would then be blocked by the decorative paper layer 110, the decorative paper layer 110 may include a cutout of the light emissive layer 234 for light to emit through the decorative paper layer 110.

As shown in row 210, a dielectric layer (236, 238) may be disposed over both the light emissive layer 234 and the first electrically-conductive layer 232 of the electroluminescent element. The dielectric layer may be shown as dielectric layer 236 when the dielectric layer may be disposed over the first electrically-conductive layer 232 of the electroluminescent element. The dielectric layer is shown as dielectric layer 238 when the dielectric layer may be disposed over the light emissive layer 234 that may be disposed over the decorative paper layer 110. Accordingly, when the decorative paper layer 110 is stacked above dielectric layer 236, the decorative paper layer 110 may be disposed between the dielectric layer 236 and the light emissive layer 234. In either embodiment, the dielectric layer (236, 238) may be barium titanate ($BaTiO_3$) particles, or any suitable material to form a dielectric of the electroluminescent element. Alternatively, although not pictured, if the electroluminescent material is disposed directly over the first electrically-conductive layer 232 to form the light emissive layer 234 of the electroluminescent element as described above, the dielectric layer may be disposed over the light emissive layer 234. Therefore, various embodiments of the present disclosure are not limited to the dielectric layer (236, 238) disposed over the first electrically-conductive layer 232, but rather, encompass the dielectric layer (236, 238) disposed over the light emissive layer 234.

As shown in row 212, a translucent electrically-conductive material may be disposed over insulating layer 108 to form the second electrically-conductive layer 240. The translucent electrically-conductive material suitable for use in accordance with the various embodiments of the laminate 200 includes any material which can be disposed upon paper, and which may be electrically electrically-conductive. Suitable translucent electrically-conductive material includes antimony-doped tin oxide (ATO) or indium tin oxide (ITO) particles or any suitable material to form a translucent conductor of the electroluminescent element. In some embodiments, a transparent electrically-conductive material may be used instead of the translucent electrically-conductive material. The insulating layer 108 may not require third via hole 230 if the insulating layer 108 is less than half the basis weight of the paper layer 112 or bleached kraft paper, because the translucent electrically-conductive material disposed over insulating layer 108 will penetrate through the insulating layer 108 to form the second electrically-conductive layer 240. Otherwise, if the insulating layer 108 is not less than half the basis weight of the paper layer 112, the insulating layer 108 will require the third via hole 230 so that an electrically-conductive material that fills vias 230 and 226 electrically couples the second electrically-conductive layer 240 with second via 226 through the insulating layer 108 after a lamination process. It should be understood that throughout this application via holes are alternatively referred to as vias once conductive material is included therein and a lamination process that establishes electrical contact between conductive elements is performed.

Alternatively, although not pictured, the translucent electrically-conductive material may be disposed directly over the dielectric layer (236, 238) to form a second electrically-conductive layer 240 of the electroluminescent element. If the translucent electrically-conductive material is disposed directly over the dielectric layer 238 to form the second electrically-conductive layer 240 of the electroluminescent element, the decorative paper layer 110 that may be disposed between the second electrically-conductive layer 240 and the light emissive layer 234 has a via hole 228 through the decorative paper layer 110 that may be vertically aligned with the second via hole 226 of the paper layer 112. Because of via hole 228, an electrically-conductive material that fills via holes 228 and 226 electrically couples the second electrically-conductive layer 240 with second via 226 by traversing through the decorative paper layer 110.

Alternatively, as shown in column 214, an electrically-conductive material having a bus bar trace pattern may be disposed with the bus bar trace pattern over insulating layer 108 to form a bus bar 244 of the electroluminescent element. The electrically-conductive material having the bus bar trace may be the same or different material as the electrically-conductive material disposed over paper layer 112 to form the first electrically-conductive layer 232. The translucent electrically-conductive material may then be disposed over the bus bar 244 to form an electrically-conductive layer 246. After the layers described above undergo the high pressure lamination process, laminate 248 may be formed, which exhibits higher conductivity than the laminate 242 because of the addition of the bus bar 244. The laminates 242 and 248 may be used as surfacing material in both commercial and residential applications, such as on furniture, kitchen countertops, table tops, store fixtures, bathroom vanity tops, cabinets, windows, doors, wall paneling, office partitions, and other supporting substrates.

In both the laminate 242 and laminate 248, by filling the via holes 224, 226 with an electrically-conductive material, after a lamination process, the first electrically-conductive layer 232 may be electrically coupled to first via 224 and the second electrically-conductive layer 240 may be electrically coupled to second via 226 because the first via 224 makes electrical contact with the first electrically-conductive layer 232 disposed over paper layer 112 and second via 226 makes electrical contact with the second electrically-conductive layer 240 disposed over either the dielectric layer (236, 238) or the insulating layer 108. The electrically-conductive material used to fill the vias 224, 226 may be the same or different material as the electrically-conductive material disposed over paper layer 112 to form the first electrically-conductive layer 232, and the electrically-conductive material having a bus bar trace pattern disposed over insulating layer 108 to form the bus bar 244.

In either embodiment, after a lamination process, the paper layer 112 and the insulating layer 108 encapsulate the first electrically-conductive layer 232, the light emissive layer 234, the dielectric layer (236,238), and the second electrically-conductive layer 240 within the laminate 200. Specifically, after the layers described above undergo a lamination process, preferably a high pressure lamination process, the resin that may be impregnated in the paper layer 112 consolidates and bonds together (by heat and pressure) the first electrically-conductive layer 232, the light emissive layer 234, the dielectric layer (236,238), and the second electrically-conductive layer 240 into a substantially continuous resin structure having significant mechanical structure, thereby forming the laminate 242, 248.

Figure 3:
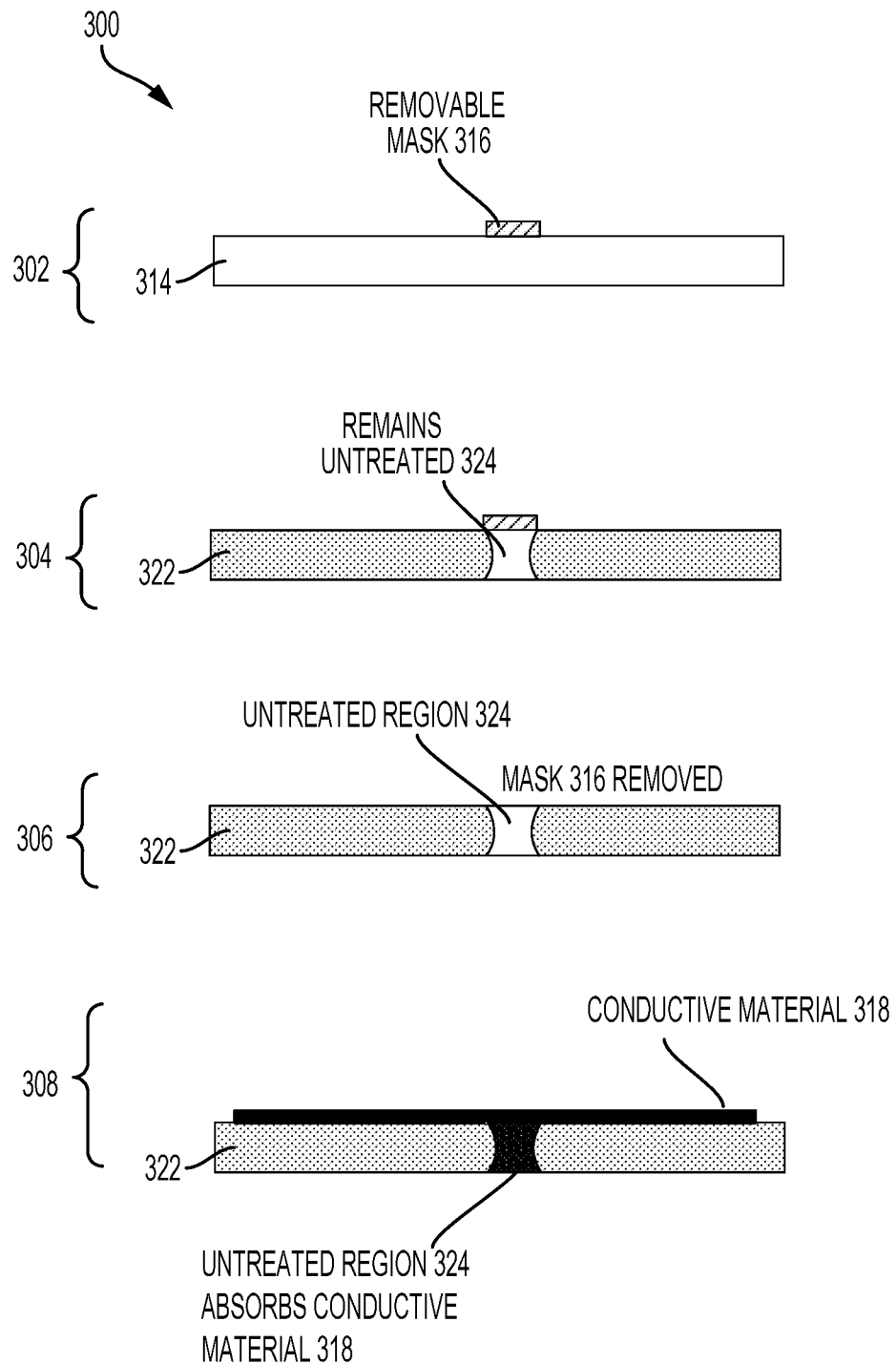
FIG. 3 generally illustrates example operations for forming an electrical via between layers in a laminate using a masking technique.

FIG. 3 illustrates an example operation 300 for forming an electrical via, such as vias 216-230 of FIG. 2 between paper layers in a laminate using a masking technique. A paper layer for a laminate including an electrical element may be prepared with a sheet of untreated kraft paper 314 (e.g., paper layer 112 of FIG. 2) and partially covered with a removable mask 316 on one side of untreated paper sheet 314 at a location of a desired electrical connection through the paper 314 at operation 302.

A resin-treating operation 304 impregnates the kraft paper 314 with a resin to form resin-treated paper 322. The mask 316 protects a portion 324 of the resin-treated kraft paper 322 during the resin-treating operation 304 and the portion 324 does not become impregnated with the resin. A removing operation 306 removes the mask 316, exposing the untreated region 324 of the resin-treated kraft paper 322.

A disposing operation 308 disposes electrically-conductive material (e.g., the first electrically-conductive material 318) onto the untreated region 324 of the resin-treated kraft paper 322. The electrically-conductive material saturates untreated region 324, but does not saturate the resin-treated region of kraft paper 314, thereby allowing for electrical conductivity through the paper 314.

Figure 4:
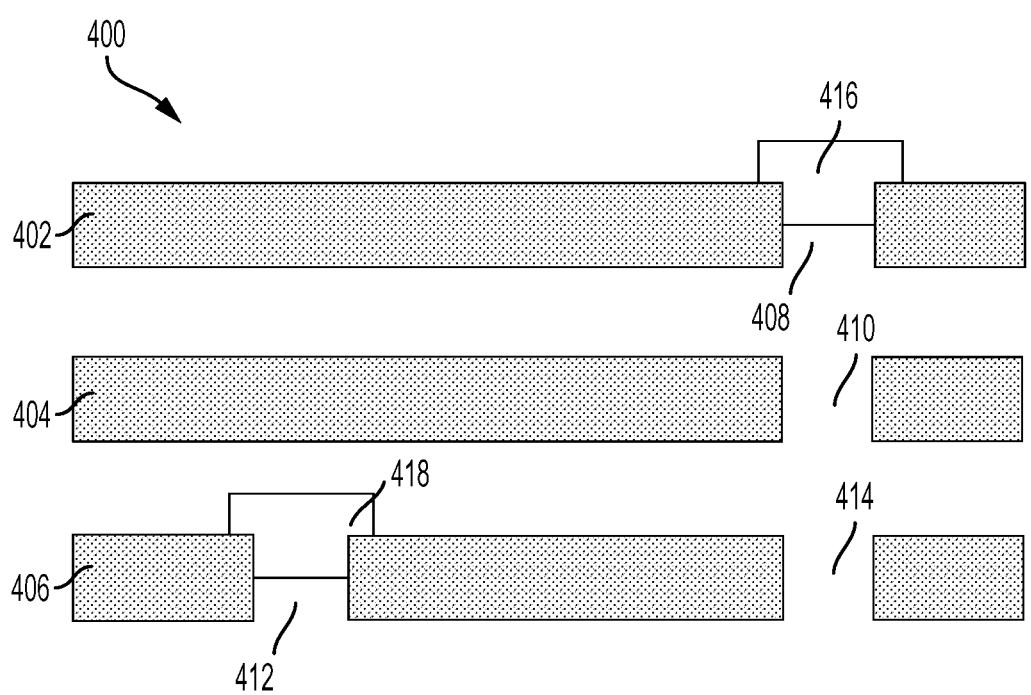
FIG. 4 generally illustrates example operations for forming an electrical via between layers in a laminate using a hole cutting technique.

FIG. 4 illustrates an example operation 400 for forming an electrical via between layers in a laminate using a hole cutting technique. A hole forming operation 400 forms a via hole in a layer of a laminate. For example, hole forming operation 400 may form via holes 408, 410, 412, or 414 in layers 402, 404, and 406, respectively. With reference to FIG. 2, via hole 408 may be via hole 230, via hole 410 may be via hole 228, via hole 412 may be via hole 224, and via hole 414 may be via hole 226. Layer 402 may be an insulating layer 108, layer 404 may be decorative paper layer 110, and layer 406 may be paper layer 112. The material 416 disposed on layer 402 may be, for instance, as shown in FIG. 2, translucent electrically-conductive material to form the second electrically-conductive layer 240, and the material 418 disposed on layer 406 may be electrically-conductive material to form the first electrically-conductive layer 232. An electrically-conductive material may fill via hole 412, to electrically couple to material 418 after a lamination process is conducted. Similarly, an electrically-conductive material may fill via 414, 410, and 408 to electrically couple to material 416 after a lamination process is conducted. A high pressure lamination process may then apply high heat and pressure to the stack of layers arranged in hole forming operation 400 to encapsulate the laminate.

Figure 5:
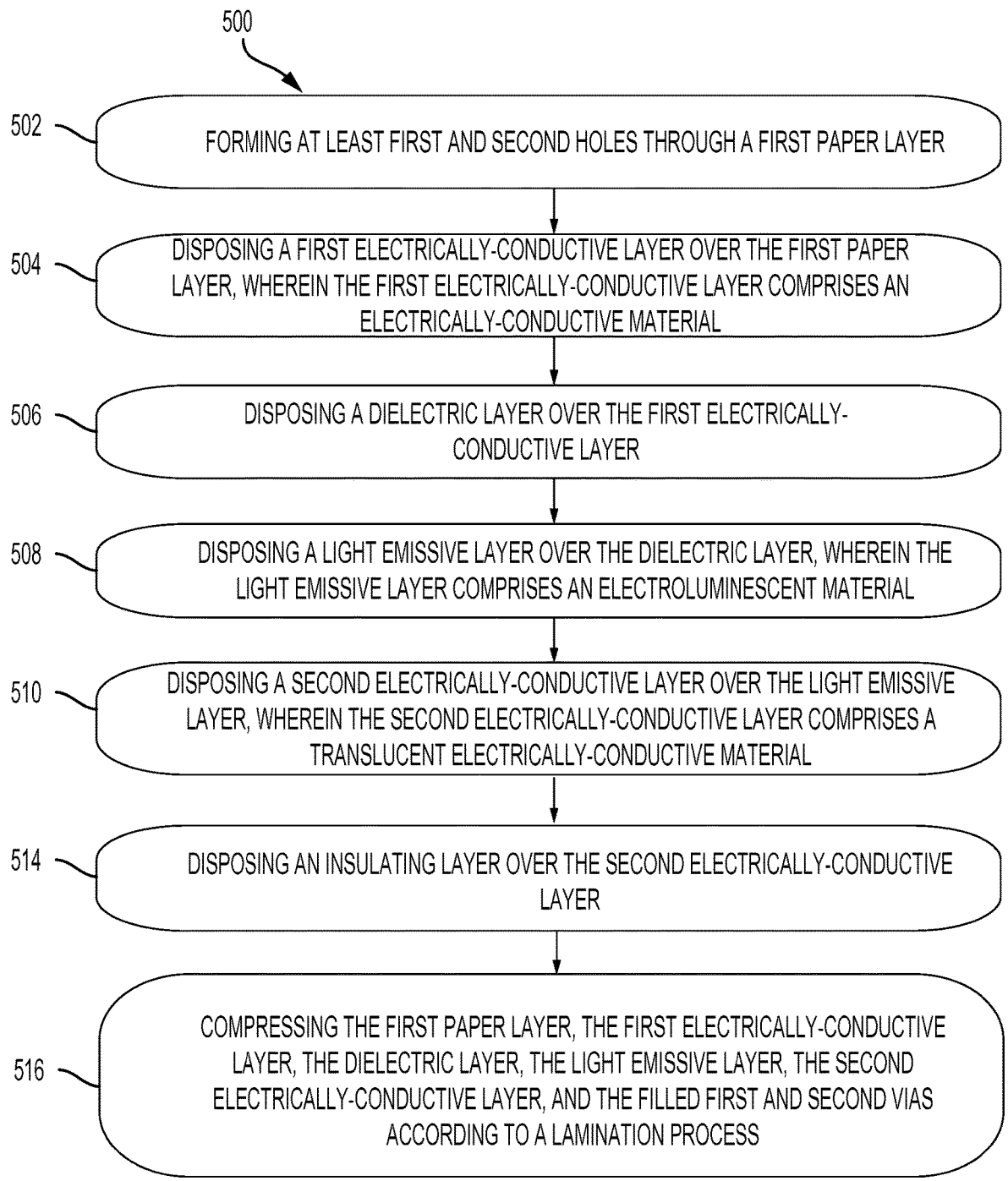
FIG. 5 shows a flowchart for manufacturing a laminate having an electroluminescent element disposed on multiple layers within the laminate.

FIG. 5 shows a flowchart for manufacturing a laminate having an electroluminescent element disposed within the laminate according to one embodiment. The method 500 may be implemented, in whole or in part, by cutting, disposing and high pressure lamination process system(s), implemented by one or more processors, sensors, and/or computer-executable instructions stored on non-transitory computer-readable medium or media.

The method 500 may begin by forming at least first and second via holes through a first paper layer (block 502). With reference to FIG. 2, the method 500 may form a hole or via that may be formed or cut through the entire paper layer. For example, method 500 may form via holes 224, 226 through paper layer 112. Similarly, method 500 may form via hole 230 through insulating layer 108 depending on application. If the laminate 200 requires a decorative paper layer, method 500 may form via hole 228 through decorative paper layer 110. If the laminate 200 requires additional paper layers, method 500 may form via holes 220, 222 and vias 216, 218 on additional paper layers 114, 116, respectively. The via holes described may be formed, cut through, or punched through, such as by a mechanical device or a laser, such that upon stacking paper layers on top of each other, the vias are vertically aligned with each other. For example, via holes 216, 220, and 224 and vias 218, 222, 226, 228, 230 are vertically aligned with one another when paper layers in row 204 are stacked on top of each other. As such via holes of one paper layer may be vertically aligned with via holes of another paper layer.

Method 500 proceeds by disposing a first electrically-conductive layer over the first paper layer, the first electrically-conductive layer including an electrically-conductive material (block 504). With reference to FIG. 2, method 500 may dispose an electrically-conductive material over paper layer 112 to form a first electrically-conductive layer 232 of the electroluminescent element. The electrically-conductive materials may be disposed in any shape, size, and may even form an outline of an aesthetic design. Disposing the electrically-conductive material may involve disposing electrically-conductive material over top of and into one or more via holes. In this step, the first via hole is typically also filled. Electrically-conductive materials suitable for use include any material which can be disposed upon paper, particularly resin-impregnated paper, and which may be electrically electrically-conductive. Suitable electrically-conductive materials include metals, alloys, and electrically-conductive inks. Electrically-conductive inks are commercially available from a number of sources and can be prepared using a number of known methods. Particularly preferred electrically-conductive inks suitable for use in various preferred embodiments of the present disclosure include silver and/or electrically-conductive carbon particles. Method 500 may dispose additional paper layers 114, 116 on the side of the paper layer 112 opposite the first electrically-conductive layer 232 of the electroluminescent element. Alternatively, additional paper layers 114, 116 may be disposed on the same side of the paper layer 112 as the first electrically-conductive layer 232 of the electroluminescent element Method 500 proceeds by disposing a dielectric layer over the first electrically-conductive layer (block 506). With reference to FIG. 2, method 500 may dispose dielectric layer 236 over the first electrically-conductive layer 232 of the electroluminescent element. The dielectric layer 236 may be barium titanate ($BaTiO_3$) particles, or any suitable material to form a dielectric of the electroluminescent element.

Method 500 proceeds by disposing a light emissive layer over the dielectric layer, wherein the light emissive layer comprises an electroluminescent material (block 508). With reference to FIG. 2, method 500 may dispose an electroluminescent material over the decorative paper layer 110 (if needed) to form a light emissive layer 234 of the electroluminescent element. The light emissive layer 234 disposed over the decorative paper layer 110 may be disposed over the dielectric layer 236. The electroluminescent material may be zinc sulfide (ZnS) doped with manganese, copper, a fluorescent material, a phosphorescent material, or any suitable material to form a light emissive layer of the electroluminescent element Method 500 proceeds by disposing a second electrically-conductive layer over the light emissive layer (block 510). The second electrically-conductive layer may include a translucent electrically-conductive material. With reference to FIG. 2, method 500 may dispose translucent electrically-conductive material over insulating layer 108 to form the second electrically-conductive layer 240, and the formed second electrically-conductive layer 240 may be disposed over the light emissive layer 234. The translucent electrically-conductive material suitable for use in accordance with the various embodiments of the laminate 200 includes any material which can be disposed upon paper, and which may be electrically electrically-conductive. Suitable translucent electrically-conductive material includes antimony-doped tin oxide (ATO) or indium tin oxide (ITO) particles or any suitable material to form a translucent conductor of the electroluminescent element. In some embodiments, a transparent electrically-conductive material may be used instead of the translucent electrically-conductive material. Alternatively, method 500 may dispose translucent electrically-conductive material directly over the dielectric layer 238 to form the second electrically-conductive layer 240 of the electroluminescent element. Disposing the transparent electrically-conductive material may involve disposing electrically-conductive material over top of and into one or more vias. In this step, the second via hole can be filled.

Method 500 proceeds by disposing an insulating layer over the second electrically-conductive layer (block 514). Lastly, method 500 proceeds by compressing the first paper layer, the first electrically-conductive layer, the dielectric layer, the light emissive layer, the second electrically-conductive layer, and the filled first and second vias according to a lamination process, thereby electrically connecting the first via to the first electrically-conductive layer and the second via to the second electrically-conductive layer and encapsulating with the first paper layer, the first electrically-conductive layer, the dielectric layer, the light emissive layer, and the second electrically-conductive layer within the laminate (block 516).

By using vias, the disclosed laminate advantageously utilizes different layers to interconnect layers of an electroluminescent element disposed within the laminate 200. In addition, because the paper layer 112 and the insulating layer 108 encapsulate the first electrically-conductive layer 232, the light emissive layer 234, the dielectric layer (236,238), and the second electrically-conductive layer 240 within the laminate 200, layers of an electroluminescent element may be protected during usage of the laminate 200.

In addition to the advantages listed above, further advantages can be realized with additional structural modifications to the laminate 200. For instance, according to rows 206-210 described in FIG. 2, an electrically-conductive material may be disposed over paper layer 112 to form a first electrically-conductive layer 232 of the electroluminescent element, and the dielectric layer may be disposed directly over the first electrically-conductive layer 232 of the electroluminescent element to form dielectric layer 236. Rather than disposing both the electrically-conductive material (e.g., silver particles) and the dielectric layer (e.g., $BaTiO_3$ particles) onto the same paper layer 112, the electrically-conductive material may be disposed to one of the additional paper layers (e.g., kraft paper 114 having vias 220, 222) to form the first electrically-conductive layer 232, and the paper layer 112 may be treated or impregnated or saturated with a resin material and optionally $BaTiO_3$ particles to serve as the dielectric. Accordingly, creators of laminate 200 would have the additional flexibility of either disposing twice on the same sheet—i.e., disposing dielectric layer (e.g., $BaTiO_3$ particles) onto the same paper layer 112 that was previously disposed with the electrically-conductive material to form the first electrically-conductive layer 232, or disposing once on one sheet and undergoing a paper impregnation process on another sheet—i.e., disposing the electrically-conductive material to one of the additional paper layers (e.g., kraft paper 114 having vias 220, 222) and undergoing a paper impregnation process on the paper layer 112.

Further, in order to encapsulate the first electrically-conductive layer 232, the light emissive layer 234, the dielectric layer (236,238), and the second electrically-conductive layer 240 into a continuous resin structure, rather than impregnating the paper layer 112 with a resin material, a glue film layer impregnated with a resin material may be disposed between untreated paper layer 112 and the insulating layer 108. Similarly, if decorative paper layer 110 is needed, the glue film layer impregnated with a resin material may be disposed between the paper layer 112 and the decorative paper layer 110. After undergoing the high pressure lamination process, the resin material from the glue film layer can saturate untreated paper, such as untreated paper layer 112, untreated decorative paper layer 110, and insulating layer 108, to encapsulate the first electrically-conductive layer 232, the light emissive layer 234, the dielectric layer (236, 238), and the second electrically-conductive layer 240 into a continuous resin structure.

Although the laminate 200 as illustrated includes paper layer 112 and optional paper layers 114, 116, optional decorative paper layer 110, and an insulating layer 108, it should be understood that the present disclosure is not limited to the precise configuration shown. For instance, additional paper layers may be stacked below optional paper layer 116. Such additional paper layers may provide space for embedding one or more electrical components to drive the electroluminescent element disposed within the laminate structure. As another example, a treated overlay may be disposed over the second electrically-conductive layer 240 to further protect and encapsulate the laminate 200.

As used herein, the singular terms "a" and "the" are synonymous and used interchangeably with "one or more" and "at least one," unless the language and/or context clearly indicates otherwise. Accordingly, for example, reference to "a paper layer" or "the paper layer" herein or in the appended claims can refer to a single paper layer or more than one paper layer. Additionally, all numerical values, unless otherwise specifically noted, are understood to be modified by the word "about."

For simplicity and clarity of illustration, elements in the figures are not necessarily to scale, and the same reference numbers in different figures denote the same elements. For clarity of the drawing, layers and electrically-conductive materials may be shown as having generally straight line edges and precise angular corners. However, those skilled in the art understand that the edges need not be straight lines and the corners need not be precise angles.

Certain terminology is used in the following description for convenience only and is not limiting. Ordinal designations used herein and an it appended claims, such as "first", "second", "third", etc., are solely for the purpose of distinguishing separate, multiple, similar elements (e.g., a first paper layer and a second paper layer), and do not import any specific ordering or spatial limitations unless otherwise required by context.

The applications and benefits of the systems, methods and techniques described herein are not limited to only the above examples. Many other applications and benefits are possible by using the systems, methods and techniques described herein.

Moreover, although the foregoing text sets forth a detailed description of numerous different embodiments, it should be understood that the scope of the patent is defined by the words of the claims set forth at the end of this patent. The detailed description is to be construed as exemplary only and does not describe every possible embodiment because describing every possible embodiment would be impractical, if not impossible. Numerous alternative embodiments could be implemented, using either current technology or technology developed after the filing date of this patent, which would still fall within the scope of the claims.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

What is claimed:

1. A laminate having an electroluminescent element disposed within the laminate, the laminate comprising:
   a first paper layer;
   a first electrically-conductive layer comprising an electrically-conductive material, the first electrically-conductive layer being disposed over the first paper layer;
   a light emissive layer comprising an electroluminescent material, the light emissive layer being disposed over the first paper layer;
   a second electrically-conductive layer comprising a translucent electrically-conductive material, the second electrically-conductive layer being disposed over the light emissive layer;
   an insulating layer disposed over the second electrically-conductive layer,
   wherein the first paper layer and the insulating layer encapsulate the first electrically-conductive layer, the light emissive layer, and the second electrically-conductive layer within the laminate.

2. The laminate of claim 1, wherein the first paper layer has first and second vias through the first paper layer, and wherein the first electrically-conductive layer is electrically coupled to the first via and the second electrically-conductive layer is electrically coupled to the second via, the first and second vias including an electrically-conductive material therein.

3. The laminate of claim 1, further comprising a decorative paper layer disposed between the first electrically-conductive layer and the light emissive layer.

4. The laminate of claim 1, wherein the insulating layer is a treated overlay.

5. The laminate of claim 1, wherein the first paper layer is impregnated with a resin material.

6. The laminate of claim 5, wherein the resin material comprises a phenolic resin.

7. The laminate of claim 1, further comprising a decorative paper layer disposed between the second electrically-conductive layer and the light emissive layer.

8. The laminate of claim 7, the decorative paper layer further comprising an aperture, the light emissive layer capable of emitting light through the aperture.

9. The laminate of claim 8, wherein at least one glue film layer impregnated with a resin material is disposed between the first paper layer and the decorative paper layer.

10. The laminate of claim 1, wherein the insulating layer is less than half the basis weight of the first paper layer.

11. The laminate of claim 1, wherein the insulating layer comprises bleached kraft paper.

12. The laminate of claim 2, wherein the second via traverses through the insulating layer.

13. The laminate of claim 1, wherein an electrically-conductive material is patterned over the insulating layer to provide a bus bar electrically coupled to the second electrically-conductive layer.

14. The laminate of claim 13, wherein the electrically-conductive material of the first electrically-conductive layer and the electrically-conductive material of the bus bar are the same.

15. The laminate of claim 1, further comprising:
at least a third paper layer disposed on a side of the first paper layer opposite the first electrically-conductive layer.

16. The laminate of claim 1, wherein the first electrically-conductive layer comprises silver particles.

17. The laminate of claim 1, wherein the electroluminescent material is a fluorescent material or a phosphorescent material.

18. The laminate of claim 1, wherein the first electrically-conductive layer outlines an aesthetic design.

19. A solid surface comprising the laminate according to claim 1 disposed on a supporting substrate.

20. A method for manufacturing a laminate having an electroluminescent element disposed within the laminate, the method comprising:

disposing a first electrically-conductive layer over a first paper layer, wherein the first electrically-conductive layer comprises an electrically-conductive material;

disposing a light emissive layer over the first electrically-conductive layer, wherein the light emissive layer comprises an electroluminescent material;

disposing a second electrically-conductive layer over the light emissive layer, wherein the second electrically-conductive layer comprises a translucent electrically-conductive material;

disposing an insulating layer over the second electrically-conductive layer; and compressing the first paper layer, the first electrically-conductive layer, the light emissive layer, the second electrically-conductive layer, and the insulating layer according to a lamination process, thereby encapsulating the first electrically-conductive layer, the light emissive layer, and the second electrically-conductive layer within the first paper layer and the insulating layer to manufacture a laminate having an electroluminescent element disposed within the laminate.

* * * * *